United States Patent
Hashizume et al.

(10) Patent No.: US 6,789,617 B1
(45) Date of Patent: Sep. 14, 2004

(54) AIR MIX DAMPER DEVICE AND VEHICLE AIR CONDITIONER

(75) Inventors: Yoshihiro Hashizume, Nishi-kasugai-gun (JP); Hideto Noyama, Nishi-kasugai-gun (JP); Shiro Matsubara, Nishi-kasugai-gun (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/719,538

(22) PCT Filed: Apr. 10, 2000

(86) PCT No.: PCT/JP00/02318
§ 371 (c)(1),
(2), (4) Date: Jun. 13, 2001

(87) PCT Pub. No.: WO00/63035
PCT Pub. Date: Oct. 26, 2000

(30) Foreign Application Priority Data

Apr. 16, 1999 (JP) .............................. 11-110141

(51) Int. Cl.⁷ ................................ B60H 3/00; B60H 1/00
(52) U.S. Cl. ........................... 165/202; 165/42; 165/43; 165/103; 454/156; 454/160; 454/161; 237/12.3 A; 237/12.3 B; 236/13; 251/250.5; 251/294
(58) Field of Search ............................ 165/202, 42, 43, 165/103; 454/156, 160, 161; 237/12.3 A, 12.3 B; 236/13; 251/250.5, 294

(56) References Cited

U.S. PATENT DOCUMENTS 4,285,499 A * 8/1981 Zukausky .................. 251/294
4,327,894 A * 5/1982 Ewing .......................... 74/516
4,452,301 A * 6/1984 Last et al. .................... 165/42
4,638,977 A    1/1987 Vonhausen ................. 251/248
4,653,689 A * 3/1987 Sakurai et al. ......... 237/12.3 A
4,697,734 A * 10/1987 Ueda ........................... 236/13
4,698,980 A * 10/1987 Noguchi et al. .............. 165/43
5,775,415 A * 7/1998 Yoshimi et al. ............. 165/202
5,881,994 A    3/1999 Stevenson et al. ........ 251/250.5
6,031,226 A * 2/2000 Parekh et al. ............... 251/294

FOREIGN PATENT DOCUMENTS

| EP | 0 181 631 |   | 5/1986 |
| FR | 2 620 802 |   | 3/1989 |
| JP | Sho 56-161811 |   | 12/1981 |
| JP | Sho 58-81113 |   | 6/1983 |
| JP | Sho 61-88807 |   | 6/1986 |
| JP | 6-270644 | * | 9/1994 |
| JP | 11-105533 | * | 4/1999 |

* cited by examiner

*Primary Examiner*—John K. Ford
(74) *Attorney, Agent, or Firm*—Oblon, Spivak, McClelland, Maier & Neustadt, P.C.

(57) ABSTRACT

The invention provides an air mixing damper apparatus and an air conditioning apparatus for vehicles where the temperature of discharged air can be changed linearly with respect to the operation of an actuator lever. A rotation speed adjustment mechanism is disposed between a plate door type air mixing damper 43A for opening and closing an air introducing face 42a of a heater core 42, and a rotation type lever 48 for an actuator 47 driving the air mixing damper 43A, for adjusting the rotation speed at an initial opening stage X and a final opening stage Z of the air mixing damper 43A, to a speed lower than at an intermediate opening stage Y.

5 Claims, 16 Drawing Sheets

AIR MIX DAMPER DEVICE AND VEHICLE AIR CONDITIONER

FIELD OF THE INVENTION

This invention relates to an air mixing damper apparatus and an air conditioning apparatus for vehicles, and in particular, relates to an air mixing damper apparatus and an air conditioning apparatus for vehicles which can linearly alter the temperature of the discharged air by operation of a lever of an actuator driving an air mixing damper.

DISCUSSION OF THE BACKGROUND

As is well known, an air conditioning apparatus for vehicles incorporates an inside air/outside air box comprising an inside/outside air switching damper that selectively switches introduced air to either inside air or outside air, a blower unit having a blower fan for circulating the introduced air, a cooler unit incorporating an evaporator for exchanging heat between a refrigerant and the introduced air passing therethrough, and an air conditioning unit having a heater unit.

The heater unit generally has a heater core inside a heater unit case for heating the introduced air passing therethrough, an air mixing damper apparatus for regulating the flow volume of the introduced air passing through the heater core, and a plurality of air outlets opening from the heater unit case and respectively provided with dampers.

With the air mixing damper apparatus, a plate door type air mixing damper for opening and closing an air introducing face of the heater core is connected by a link to a rotation type lever of an actuator for driving the air mixing damper. When an occupant operates a lever or the like used for setting the temperature, on the control panel provided within the vehicle compartment, the actuator is driven and the actuator lever rotates and by way of the link, starts the operation of the air mixing damper. The opening of the air mixing damper adjusts the amount of introduced air passing through the heater core and also adjusts the temperature of the discharged air.

That is to say, in the fully closed position with the air intake face of the heater core closed off, cold air from an evaporator located upstream thereof is supplied in its unchanged state as discharged air, and with an increase in opening of the air mixing damper the amount of air to be introduced passing through the heater core increases so that the temperature of the discharged air rises. When the air mixing damper is in a fully opened position, for example all of the cold air from the evaporator is passed through the heater core so that the temperature of the discharged air is increased.

However, in the case of the aforementioned conventional air mixing damper apparatus, at the time when the air mixing damper starts to open and at the time when the opening is completed, that is, during the interval that the air mixing damper is opened from a fully closed to a slightly opened position, and during the interval from a little before the fully open position through to a fully opened position, there is a problem that, compared to other positions, the temperature changes at these times is severe. That is to say, looking at FIG. 17 showing the relationship between the opening of the air mixing damper and the temperature of the discharged air, the change in temperature corresponding to movement of the actuator lever is extremely sharp at the initial opening stage where the opening of the air mixing damper is slight, and at the final opening stage where the air mixing damper is at a little before the fully open position through to the fully opened position.

This kind of phenomenon is a problem which generally arises in cases where the air mixing damper is linearly rotated together with an actuator lever. To explain simply, this is because at the time when the air mixing damper starts opening and when opening is completed it responds sensitively, and at other times when it is opened midway the response is slow.

Accordingly, if in this way it is not possible to obtain a linear change in the temperature of the discharged air with respect to the operation of an actuator lever, that is, with respect to operation by an occupant, instances arise in which it is not possible to achieve air conditioning as intended by the occupant.

For the purpose of counteracting this, it has been considered to drive the actuator so that it rotates slowly at times when the air mixing damper is starting to open and when it completes opening. However there is a problem in that such an improvement to the actuator is accompanied by higher costs.

Further, the provision of a baffle has also been considered in order to effect an appropriate change in temperature. However, there is a problem in that a decrease in air volume as a result of a baffle is unavoidable.

SUMMARY OF THE INVENTION

Accordingly the present invention provides an air mixing damper apparatus and an air conditioning apparatus for vehicles where the temperature of the discharged air can be changed linearly with respect to the operation of an actuator lever.

In order to resolve the abovementioned problems, a first aspect of the present invention is an air mixing damper apparatus characterized in that there is provided between a plate door type air mixing damper for opening and closing an air introducing face of a heater core, and a rotation type lever of an actuator for driving the air mixing damper, a mechanism for adjusting rotational speed of the air mixing damper to linearly change the temperature of discharged air with respect to the operation of the lever of the actuator. With such a construction, it becomes possible to linearly change the temperature of the discharged air with respect to the operation of the actuator lever.

A second aspect of the present invention is an air mixing damper apparatus characterized in that there is provided between a plate door type air mixing damper for opening and closing an air introducing face of a heater core, and a rotation type lever of an actuator for driving the air mixing damper, a mechanism for adjusting rotational speed at an initial opening stage and a final opening stage of the air mixing damper, to a speed lower than at an intermediate opening stage. With such a construction, it becomes possible to lower the change amount with respect to the movement of the actuator lever at the initial opening stage and the final opening stage of the air mixing damper, to a less than at the intermediate opening stage.

With a third aspect of the present invention, an air mixing damper apparatus of the first or second aspects is characterized in that the mechanism for adjusting rotational speed comprises; a cam provided in the air mixing damper and a pin provided on the lever of the actuator for engaging with the cam. With such a construction, there is no longer a need to improve the actuator.

With a fourth aspect of the present invention, the air mixing damper apparatus of the third aspect is characterized in that the cam incorporates a guide path for guiding the pin of the lever of the actuator, and the guide path has a first guide path for effecting control at an initial opening stage of the air mixing damper, a second guide path for effecting control at an intermediate opening stage of the air mixing damper, and a third guide path for effecting control at a final opening stage of the air mixing damper. With such a construction, it becomes possible to form a first guide path, a second guide path and a third guide path, in accordance with the air mixing damper.

With a fifth aspect of the present invention, the air mixing damper apparatus of the third aspect is characterized in that the cam has an opening portion with a guide path for guiding the pin of the lever of the actuator provided around the periphery thereof, and the guide path has a first guide path for effecting control at an initial opening stage of the air mixing damper, a second guide path for effecting control at an intermediate opening stage of the air mixing damper, and a third guide path for effecting control at a final opening stage of the air mixing damper. With such a construction, it becomes possible to form, for example, a first guide path, a second guide path and a third guide path in accordance with the air mixing damper.

With a sixth aspect of the present invention, the air mixing damper apparatus of the fourth or fifth aspects is characterized in that the first guide path is formed in a direction gradually separating outward with respect to a turning path of the pin of the lever of the actuator, in a fully closed position of the air mixing damper, and the third guide path is formed in a direction gradually separating outward with respect to the turning path of the pin of the lever of the actuator, in a fully open position of the air mixing damper. With such a construction, in the initial opening stage of the air mixing damper, when the air mixing damper starts to open from a fully closed position, it is possible to operate in such a way that it opens gradually. Moreover, in the final opening stage of the air mixing damper, it is also possible to operate in such a way that it opens gradually during the interval between a near fully opened position and a fully opened position.

With a seventh aspect of the present invention, the air mixing damper apparatus of the fifth or the sixth aspects is characterized in that there is provided an urging device for urging the pin of the lever of the actuator into the first guide path at least at an initial opening stage of the air mixing damper, and urging the pin of the lever of the actuator into the third guide path at least at a final opening stage of the air mixing damper. With such a construction, it becomes possible to positively guide the pin of the actuator lever in at least the first guide path and the third guide path.

With an eighth aspect of the present invention, the air mixing damper apparatus of any one of the second through seventh aspects is characterized in that the range of the opening of the air mixing damper is from fully closed to around 15 degrees in the initial opening stage, while the range of the opening of the air mixing damper is from 20 degrees from fully open to fully open in the final opening stage.

A ninth aspect of the present invention is an air conditioning apparatus for vehicles having an air conditioning unit provided with: an inside air/outside air box incorporating an inside/outside air switching damper for opening an outside air introducing inlet and an inside air introducing inlet to selectively switch introduced air to one of inside air and outside air, a blower unit having a blower fan for blowing the introduced air, a cooler unit fitted with an evaporator for exchanging heat between a refrigerant and the introduced air passing therethrough, and a heater unit having a heater core provided inside a heater unit case for heating the introduced air passing therein, an air mixing damper apparatus for adjusting the flow quantity of the introduced air which passes through the heater core, and a plurality of air outlets opening from the heater unit case and respectively provided with dampers, characterized in that the air mixing damper apparatus is an air mixing damper apparatus according to any one of the first through eighth aspects. With such a construction, it becomes possible to linearly change the temperature of the discharged air in accordance with the operation of temperature adjustment of the discharged air by an occupant.

A tenth aspect of the present invention is an air mixing damper apparatus provided with a plate door type air mixing damper for opening and closing an air introducing face of a heater core, and an operating device for specifying an operating amount of the air mixing damper, characterized in that an operating amount of the air mixing damper with respect to an operating amount of the operating device changes from operation initiation to operation completion. With such a construction, it becomes possible to stabilize the change in the temperature of the discharged air in accordance with the operation by an occupant of temperature adjustment of the discharged air.

With an eleventh aspect of the present invention, the air mixing damper apparatus of the tenth aspect is characterized in that an operating amount of the air mixing damper with respect to an operating amount of the operating device at operation initiation and operation completion is small compared to at an intermediate operation stage. With such a construction, it becomes possible to linearly change the temperature of the discharged air in accordance with the operation by an occupant of temperature adjustment of the discharged air.

DISCUSSION OF THE PREFERRED EMBODIMENTS

Figure 4:
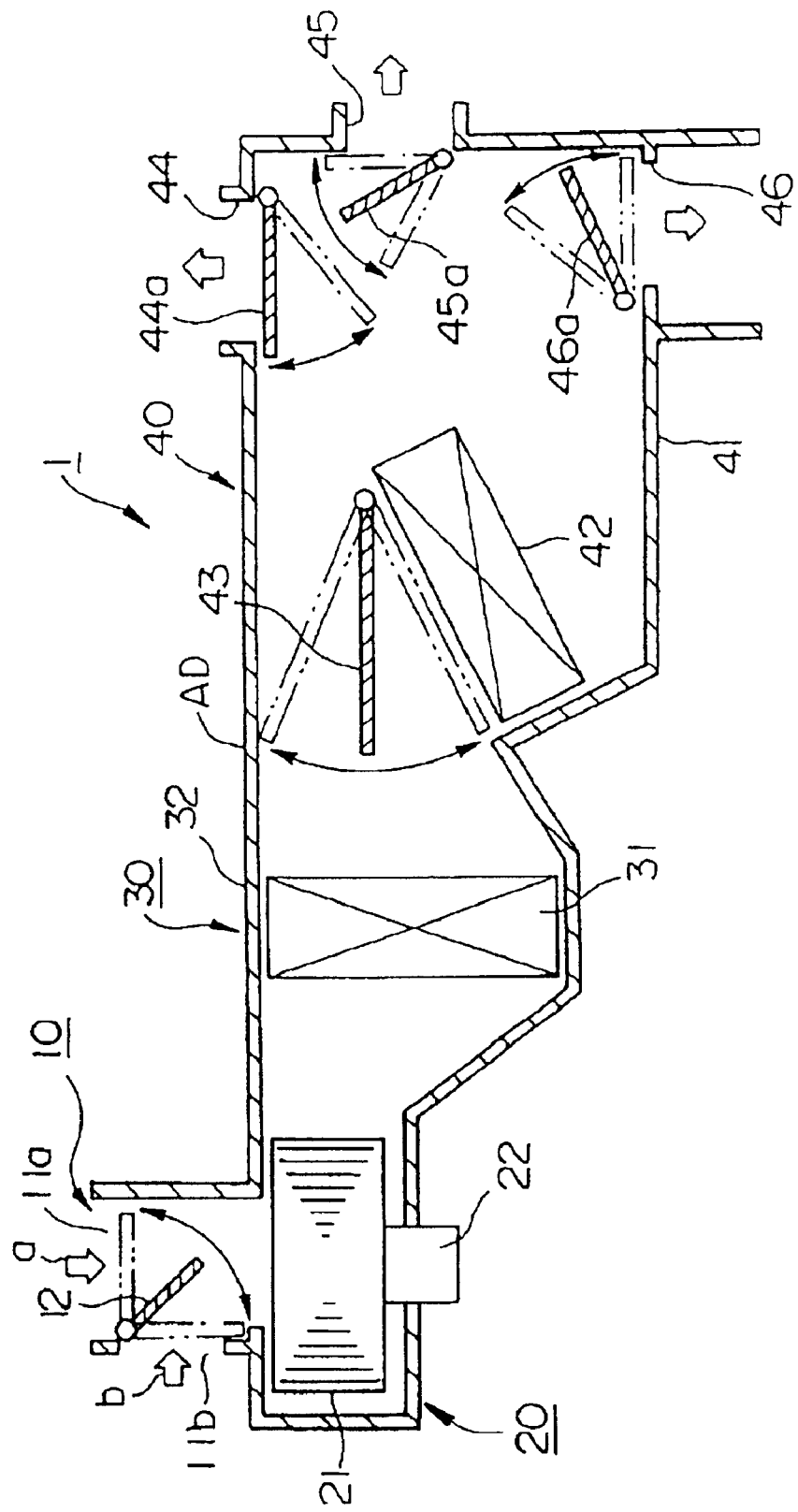
FIG. 4 is a sectional view showing an air conditioning unit of one embodiment of the present invention.
Figure 5:
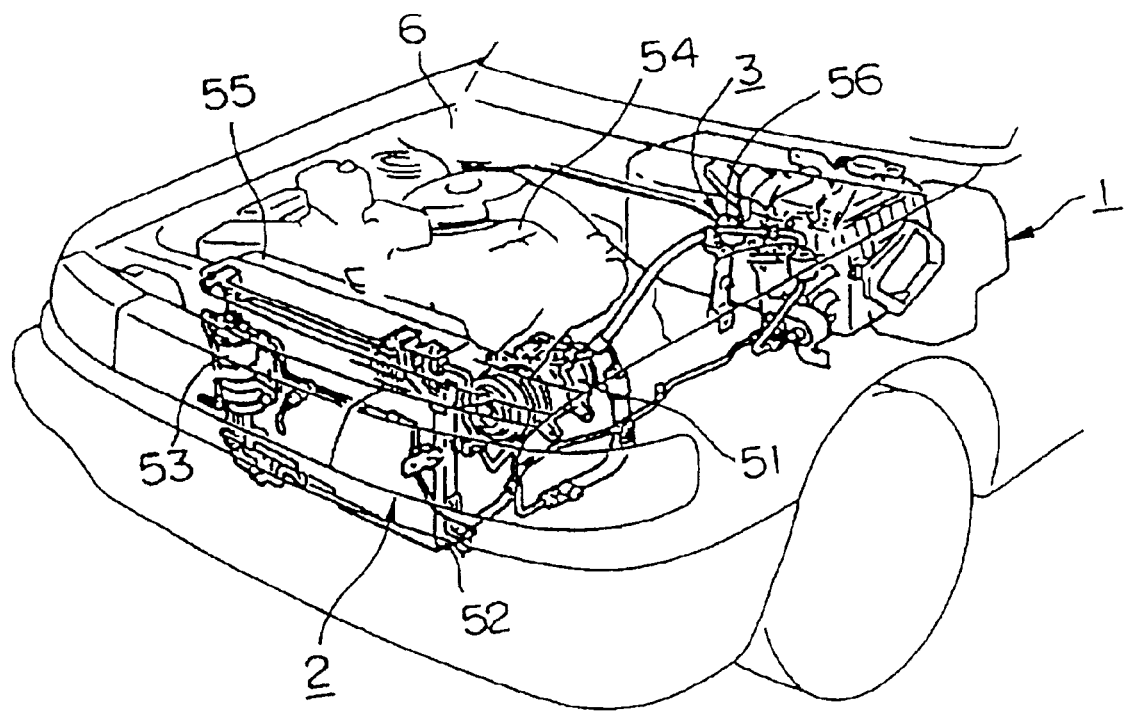
FIG. 5 is a perspective view of an engine room of a vehicle installed with an air conditioning apparatus for vehicles.
Figure 6:
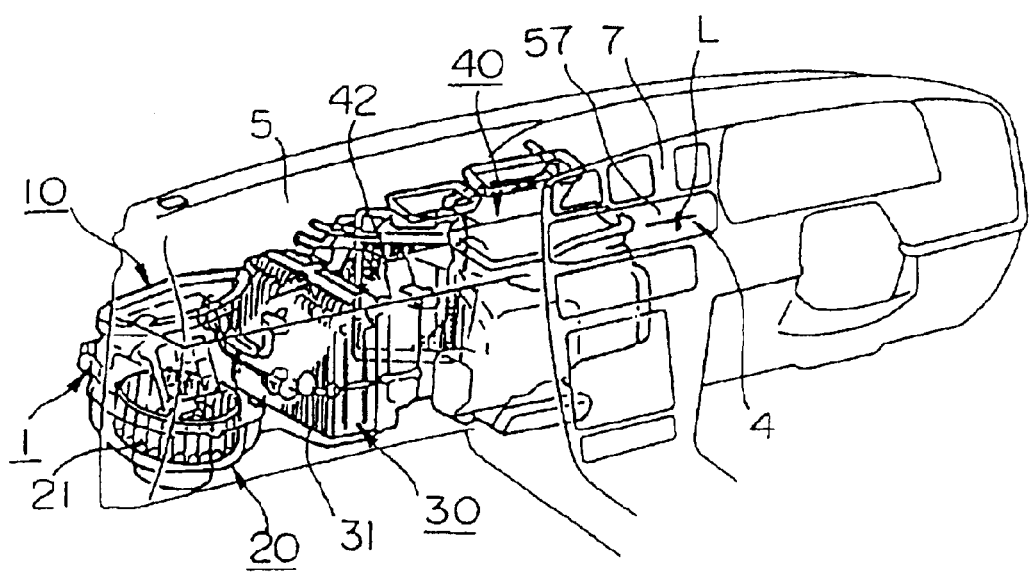
FIG. 6 is a perspective view from inside the vehicle compartment of the vehicle installed with an air conditioning apparatus for vehicles.

Hereunder is a description of embodiments of the present invention in conjunction with the drawings. FIG. 4 through FIG. 6 show the construction of an air conditioning apparatus for vehicles. This air conditioning apparatus for vehicles generally comprises: an air conditioning unit 1 for performing air conditioning such as cooling and the like, a cooling system 2 for supplying refrigerant to the air conditioning unit 1 at the time of a cooling operation, a heating system 3 for supplying engine cooling water as a heat source to the air conditioning unit 1 at the time of a heating operation, and a control section 4 for controlling the operation of the overall equipment.

The air conditioning unit 1, as shown in FIG. 4, comprises: an inside air/outside air box 10, a blower unit 20, a cooler unit 30 and a heater unit 40 either as a single unit, or connected together. As shown in FIG. 5 and FIG. 6, in the case of a typical passenger vehicle, the air conditioning unit 1 is installed widthwise on the passenger seat side, on the left side as seen from the vehicle interior, and positioned beneath the dashboard 5 behind the engine room 6. Hereunder is a description of the air conditioning unit 1 in air flow sequence.

The inside air/outside air box 10 is a part having a function of selectively switching the introduced air for the air conditioning unit 1 to either one of outside air (air outside the vehicle compartment) and inside air (air inside the vehicle compartment). Here, an outside air introducing inlet 11a communicating with the vehicle exterior and an inside air introducing inlet 11b communicating with the vehicle interior are provided. One of the two inlets 11a and 11b is closed by an inside/outside switching damper 12, to select the introduced air (hereafter referred to as introduced air).

The blower unit 20 is provided and connected downstream of the inside air/outside air box 10, and has the function of selectively drawing in outside air "a" or inside air "b" by operation of a blower fan 21, and of sending this to the cooler unit 30 (to be described later). The blower fan 21 has an electric motor 22 as the drive source, and in general, as well as a stop position, is able to be switched for several different air flow quantities. Here, in the case where outside air "a" is introduced while the vehicle is travelling, then even if the blower fan 21 is stopped, the outside air "a", which is moving relatively to the vehicle, can flow to the cooler unit 30. Moreover, depending on the air conditioning unit 1, there are also cases where the blower unit 20 is installed on the downstream side of the later described cooler unit 30.

The cooler unit 30 has the function of cooling and dehumidifying the introduced air sent from the blower unit 20.

The cooler unit 30 comprises an evaporator 31 serving as a heat exchanger, and a cooler unit case 32 housing the evaporator 31.

The evaporator 31, at the time of cooling operation, receives a supply of low temperature low pressure liquid refrigerant from the cooling system 2 (to be described later), and exchanges heat between the liquid refrigerant and the introduced air sent from the blower unit 20 and passing through the evaporator 31. As a result, the introduced air gives up heat to the refrigerant and becomes cooled and dehumidified cold air, and is then introduced to the heater unit 40.

The cooler unit case 32 is a resin molded product forming one part of the air conditioning duct AD constituting the flow path of the introduced air, with an upstream side end portion connected to the blower unit 20, and a downstream side end portion connected to the heater unit 40.

The heater unit 40 has the function of selectively heating the introduced air which has been sent from the cooler unit 30, and of discharging the air conditioned air from the air outlets in accordance with the operation mode. The heater unit 40 comprises; a heater core 42 installed inside the heater unit case 40, an air mixing damper apparatus 43 (to be described later) for adjusting the flow quantity of introduced air passing through the heater core 42, and a defroster air outlet 44, a face air outlet 45 and a foot air outlet 46, which open from the heater unit case 41 and which are respectively provided with an open/closable defroster damper 44a, face damper 45a, and foot damper 46a.

The heater core 42, at the time of a heating operation, receives a supply of high temperature engine cooling water from the heating system 3 (to be explained later), and heats the introduced air that has been sent from the cooler unit 30. The introduced air that has been sent to the heater unit 40, is divided corresponding to the opening of the air mixing damper 43A of the air mixing damper apparatus 43, into air which is passed through the heater core 42 and heated, and air which does not pass through the heater core 42.

The abovementioned defroster air outlet 44 discharges warmed and dehumidified air directly onto the inner surface of the windshield, in order to remove frost on the windshield before travelling during winter, or to remove fog on the windshield while travelling in the rain. This air conditioning operation mode is called a defroster discharging mode. Furthermore, the face air outlet 45 discharges cold air towards the upper body of an occupant at the time of a cooling operation mainly in summer. This air conditioning operation mode is called a face discharging mode.

Furthermore, the foot air outlet 46 discharges warm air towards the feet of an occupant at the time of a heating operation mainly in winter, and this is called a foot discharging mode. There is also an air conditioning operation mode called a bi-level discharging mode mainly used during the intermediate seasons of spring or autumn, which discharges air conditioned air from both the foot air outlet 45 and the face air outlet 46. In this case, as a general rule the air discharged from the face air outlet 45 is made a lower temperature than that from the foot air outlet 46 so that the head is kept cool and the feet warm.

Next, the construction of the cooling system 2 will be explained based on FIG. 5. The cooling system 2 supplies low temperature low pressure liquid refrigerant to the evaporator 31, and comprises; a compressor 51, a condenser 52, a receiver 53 (to be described later), and an expansion valve (omitted from the figure). In the case where the cooling system 2 does not require a cooling or dehumidifying function, provision thereof is omitted together with that of the evaporator 31. The compressor 51 compresses low temperature low pressure refrigerant which has absorbed heat from inside the vehicle interior at the evaporator 31 and evaporated, and discharges this as high temperature high pressure gas refrigerant to the in condenser 52. In the case of an automotive air conditioner, the compressor 51 is driven by the engine 54 by way of a belt and clutch.

The condenser 52 is provided at the front of the engine room 6 for cooling the high temperature high pressure gas refrigerant supplied from the compressor 51 with outside air, to condense and liquefy the gas refrigerant. The liquefied gas refrigerant is then sent to the receiver 53 where the vapor is separated from the liquid, and the liquid is then sent to the expansion valve (omitted from the figure) as a high temperature high pressure liquid. At the expansion valve 53, the high temperature high pressure liquid refrigerant is reduced in pressure and expanded so as to give a low temperature low pressure liquid (mist) refrigerant, which is then supplied to the evaporator 31. Here the expansion valve is normally suitably provided at a location inside the cooler unit 30 together with the evaporator 31.

Next is a brief description of the construction of the heating system 3 based on FIG. 5 and FIG. 6. The heating system 3 supplies high temperature engine cooling water serving as a heat source to the heater core 42, and introduces to the air conditioner, a part of the cooling water from the engine cooling water system which is circulated between the engine 54 and the radiator 55. This also performs flow control by means of a water valve 56.

Next is a brief description of the construction of the control section 4, base on FIG. 6. The control section 4 controls the operation of the air conditioning unit 1, the cooling system 2, and the heating system 3, constituting the air conditioner. Normally the control section 4 has built in control circuits in the operating panel 57 for performing various settings by the occupant, and is installed in a central portion of the instrument panel 7. The control section 4 is able to perform operations such as, the switching operation for the inlet air/outlet air switching damper 12, the selective switching of the various operating modes, the switching of the air flow quantity of the blower fan 21, and desired temperature setting operations.

Here, the air mixing damper 43 in the heater unit 40 will be explained. With respect to FIG. 1, the air mixing damper apparatus 43 comprises; a plate door type air mixing damper 43A for opening and closing the air introducing face 42a of the heater core 42, a rotation type lever 48 for the actuator 47 driving the air mixing damper 43A, and a rotation speed adjustment mechanism for the air mixing damper 43A disposed between the air mixing damper 43A and the lever 48, for adjusting the rotation speed at an initial opening stage X and a final opening stage Z of the air mixing damper 43A, to a speed lower than at an intermediate opening stage Y.

Here, with the present embodiment, the range of the opening of the air mixing damper 43A is from the fully closed position up to around 15 degrees in the initial opening stage X, while the range of the opening of the air mixing damper 43A is from 20 degrees from the fully open position up to fully open in the final opening stage Z. These ranges are ranges where the temperature of the discharged air changes sensitively, with respect to movement of the air mixing damper 43A. The air mixing damper 43A rotates about a shaft O1 axis, from a fully closed position (FIG. 1) where the air introducing face 42a of heater core 42 is closed so that the cold air from the evaporator 31 does not pass through, to a fully opened position (FIG. 16) where the air introducing face 42a of the heater core 42 is open allowing all of the cooling air from the evaporator 31 to pass through.

The actuator 47 comprises an electric motor for rotating about a shaft O2 axis (through a range of 100 degrees), and a lever 48 linked to a temperature setting operating lever (not shown) of the operating panel 57. A tip portion of the lever 48 is guided by an arc-shaped guide 63.

The rotation speed adjustment mechanism comprises; a cam 60 extending to the actuator 47 side and fixed to the shaft O1 of the air mixing damper 43A, and a pin 61 for engaging with the cam 60, provided at the tip of the lever 48 of the actuator 47. The cam 60 has an opening portion 62 with a guide path for guiding the pin 61 of the lever 48 of the actuator 47 provided around the periphery thereof. The guide path has a first guide path K1 for effecting control at the initial opening stage X of the air mixing damper 43A, a second guide path K2 for effecting control at the intermediate opening stage Y of the air mixing damper 43A, and a third guide path K3 for effecting control at the final opening stage Z of the air mixing damper 43A.

Figure 1:
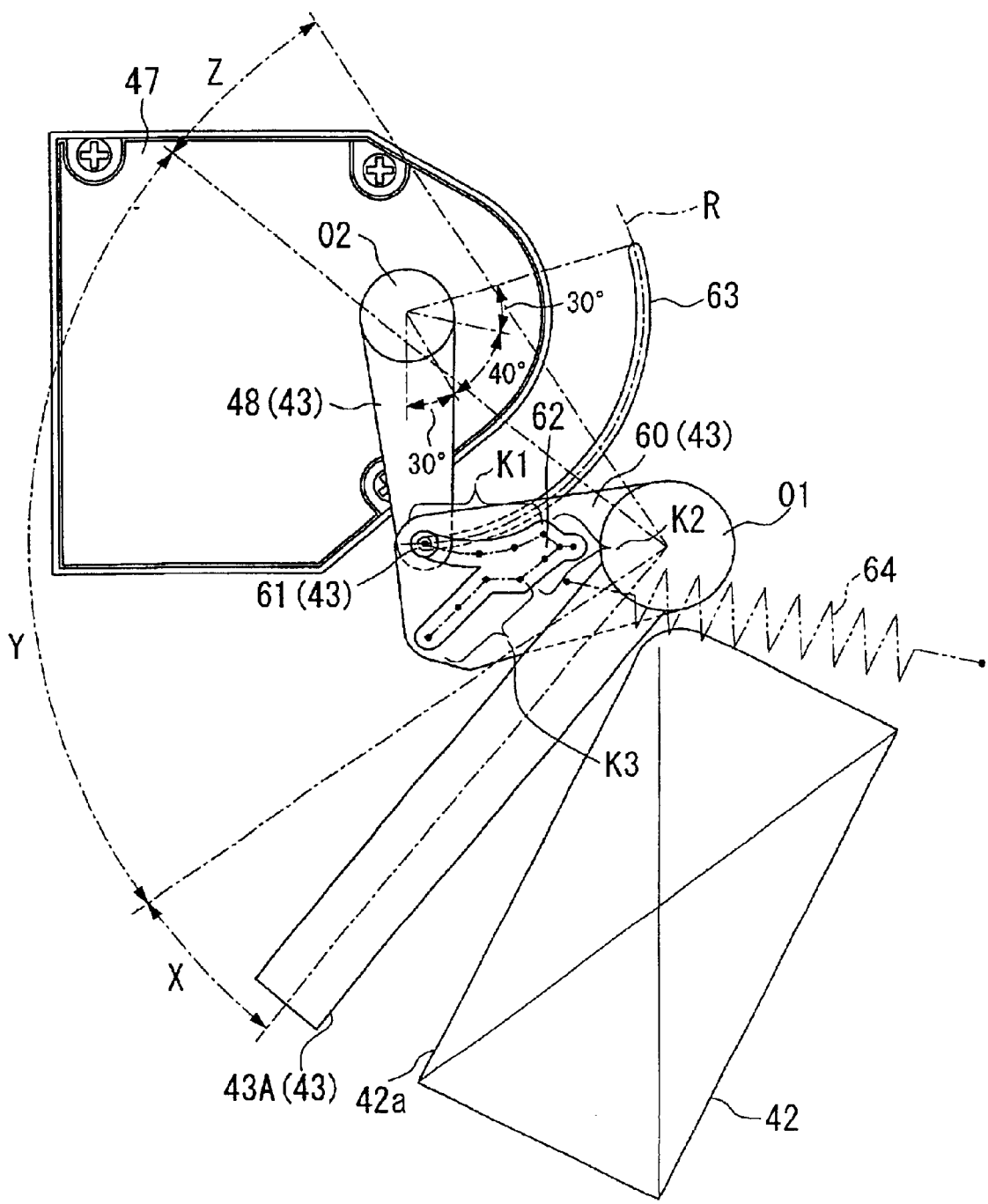
FIG. 1 is a diagram for explaining a fully closed position (lever rotation angle 0 degrees) of an air mixing damper of an embodiment of the present invention.
Figure 16:
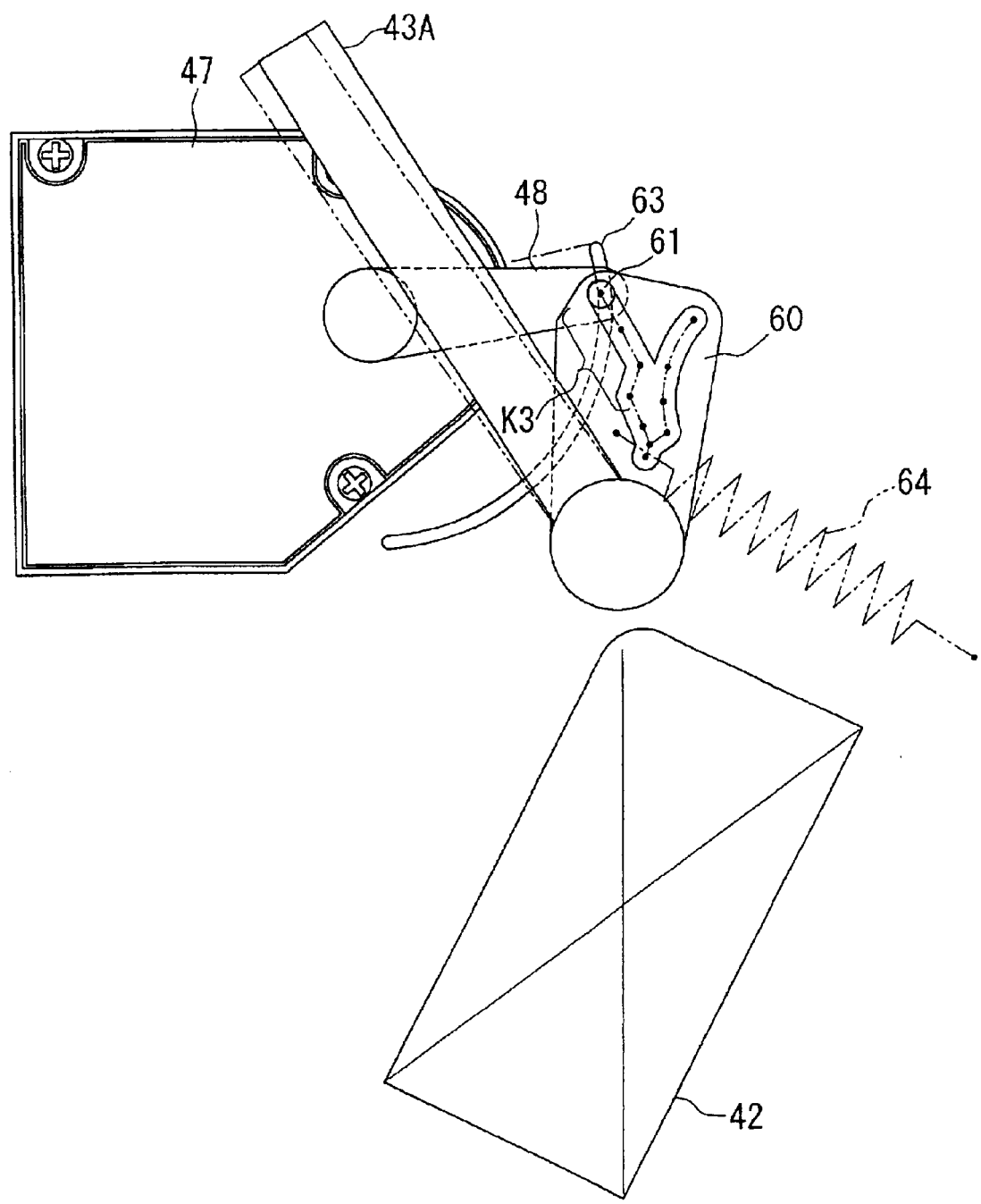
FIG. 16 is a diagram for explaining an operational state of the air mixing damper (with the lever rotation angle at 100 degrees).

The first guide path K1, as shown in FIG. 1, is formed in a direction gradually separating outward with respect to a turning path R of the pin 61 of the lever 48 of the actuator in a fully closed position of the air mixing damper 43A, and the third guide path K3, as shown in FIG. 16, is formed in a direction gradually separating outward with respect to the turning path R of the pin 61 of the lever 48 of the actuator 47, in a fully open position of the air mixing damper 43A. Accordingly, the opening portion 62 is formed in an approximate λ shape by the first guide path K1, the second guide path K2, and the third guide path K3.

Figure 12:
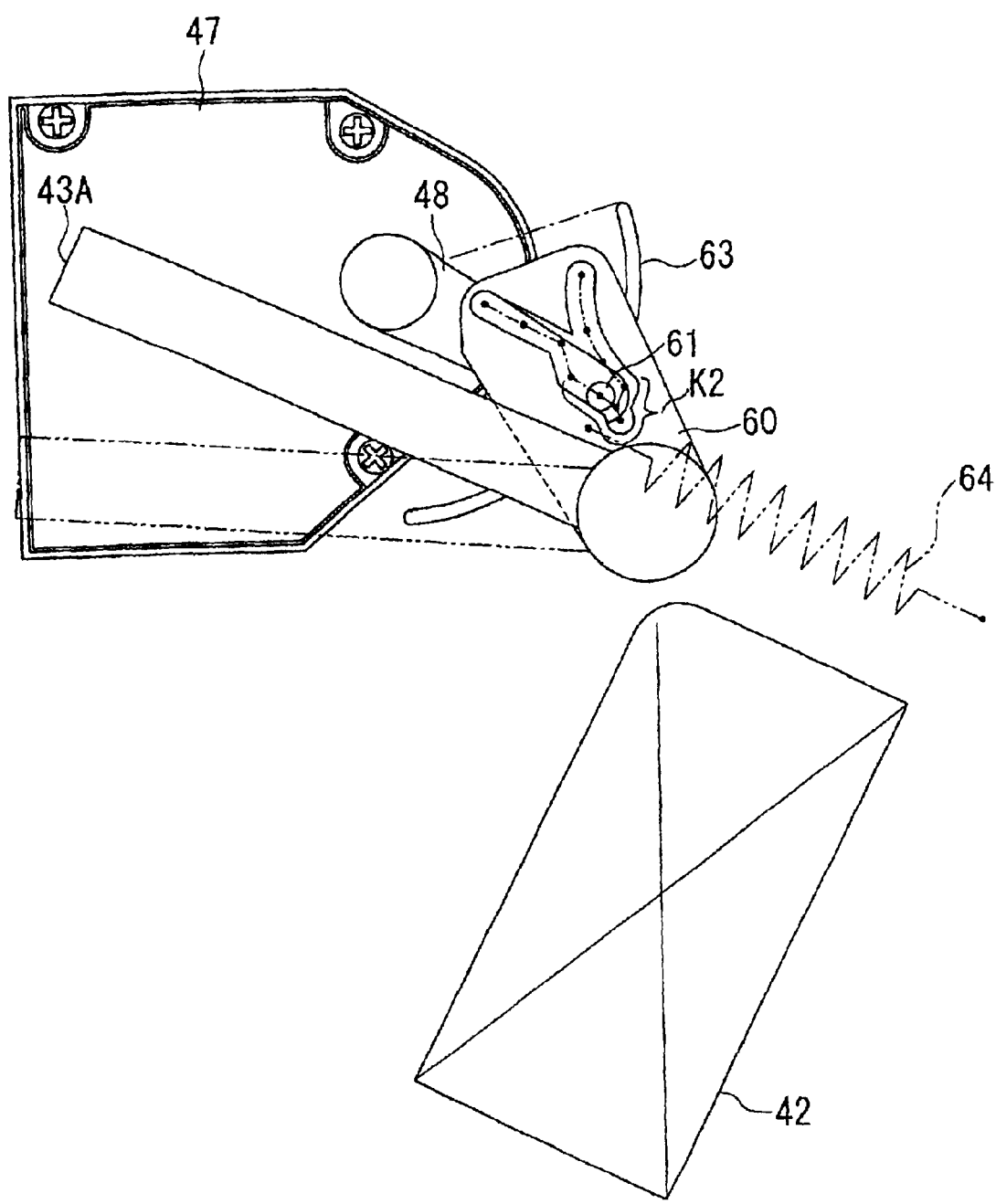
FIG. 12 is a diagram for explaining an operational state of the air mixing damper (with the lever rotation angle at 60 degrees).

The air mixing damper 43A is provided with a coil spring 64 as an urging device for urging the pin 61 of the lever 48 of the actuator 47 into the first guide path K1 at least at an initial opening stage X of the air mixing damper 43A, and urging the pin 61 of the lever 48 of the actuator 47 into the third guide path K3 at least at a final opening stage Z of the air mixing damper 43A. The coil spring 64 is shown only in FIG. 1, FIG. 12 and FIG. 16. In FIG. 12 the air mixing damper 43A is urged slightly in the clockwise direction.

Figure 7:
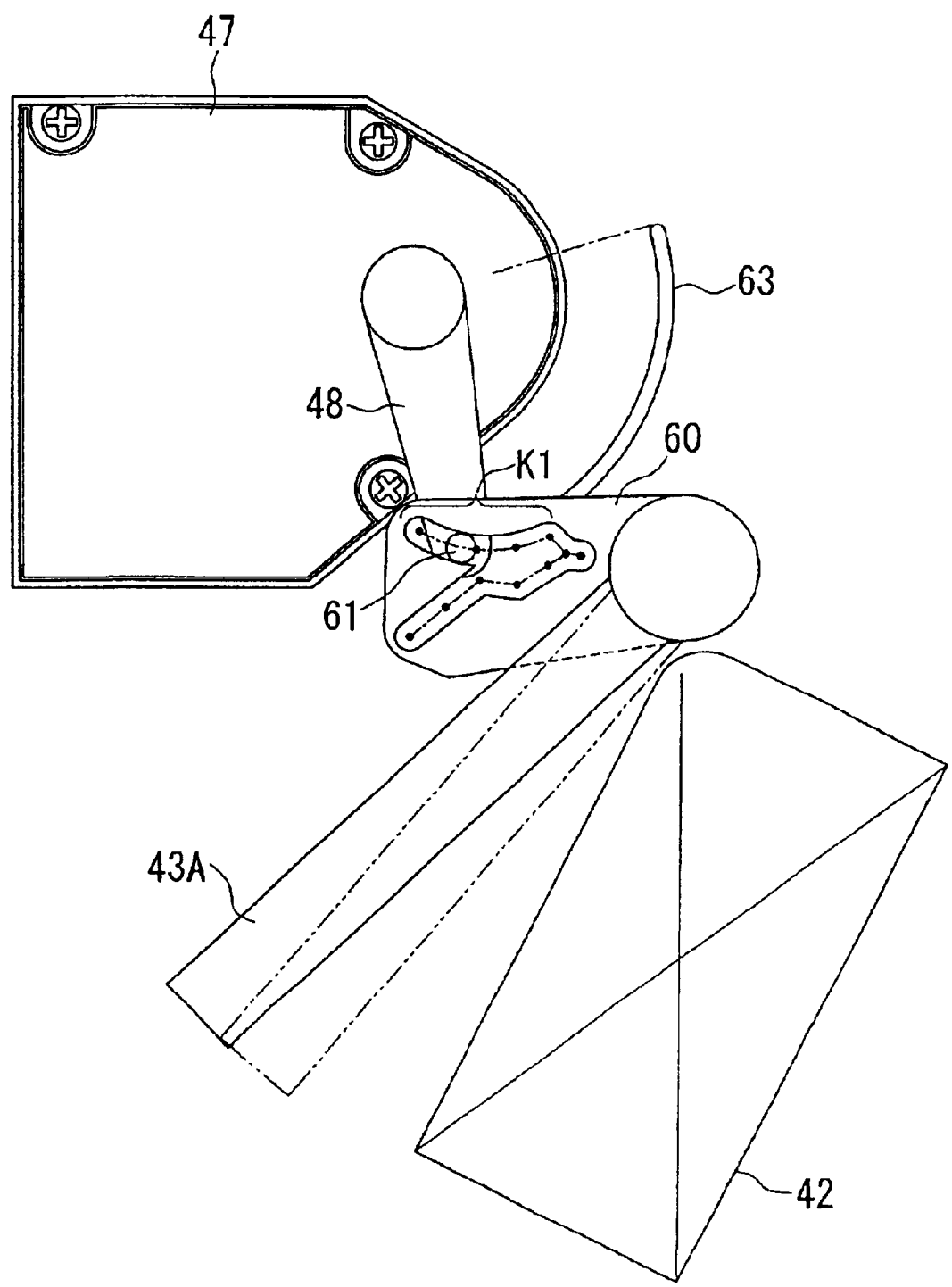
FIG. 7 is a diagram for explaining an operational state of the air mixing damper (with the lever rotation angle at 10 degrees).

Consequently, with the air mixing damper apparatus 43, while the lever 48 of the actuator 47 rotates at a uniform speed from 0 degrees to as far as 100 degrees, the air mixing damper 43A rotates at varying speeds within the range from the fully closed position to the fully opened position (rotation angle approximately 100 degrees). Specifically, this is described in FIG. 1 though FIG. 7 showing the positions for lever arm 48 rotation angles from 0 degrees through to 10 degrees respectively, and furthermore in FIG. 8 through FIG. 16 (100 degrees) showing the respective states as the rotation angle increases in 10 degrees amounts.

Figure 2:
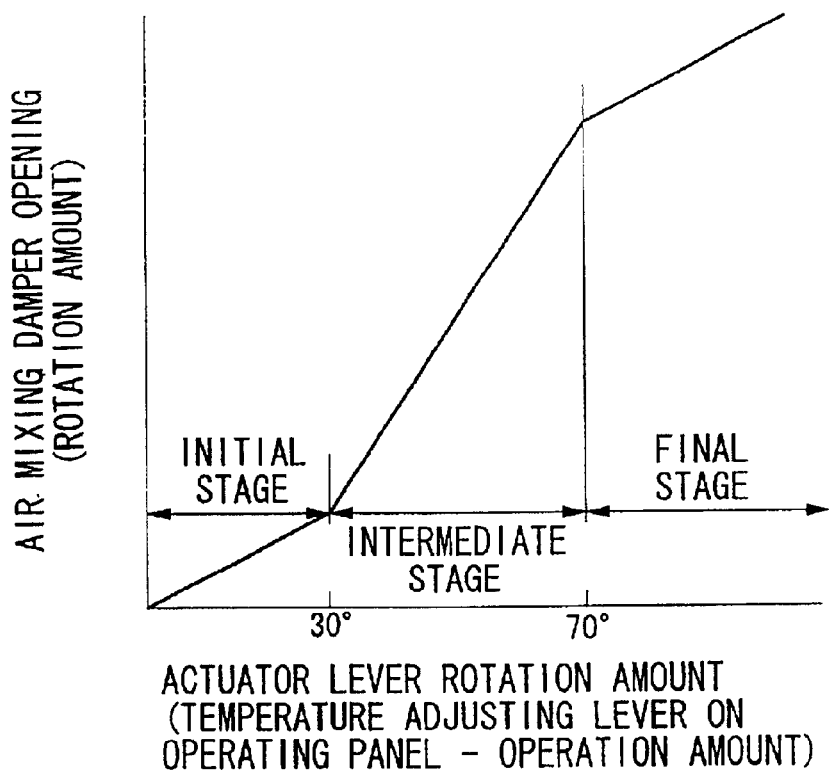
FIG. 2 is a graph showing a relationship between actuator lever rotation amount and opening of the air mixing damper of an embodiment of the present invention.

In the ranges shown in FIG. 1 and FIG. 7 through FIG. 9, the lever 48 of the actuator 47 rotates 30 degrees, and during this time the air mixing damper 43A rotates slowly within a small rotation angle range being the initial opening stage X (refer to the low incline range of FIG. 2). This is because the shape of the first guide path K1 of the cam 60, in the fully closed position in FIG. 1, is formed in a direction gradually separating outward with respect to the turning path R of the pin 61 of the lever 48. Hence at the initial opening stage X, the retraction amount of the air mixing damper 43A is small with respect of the rotation,angle of the lever 48.

Figure 8:
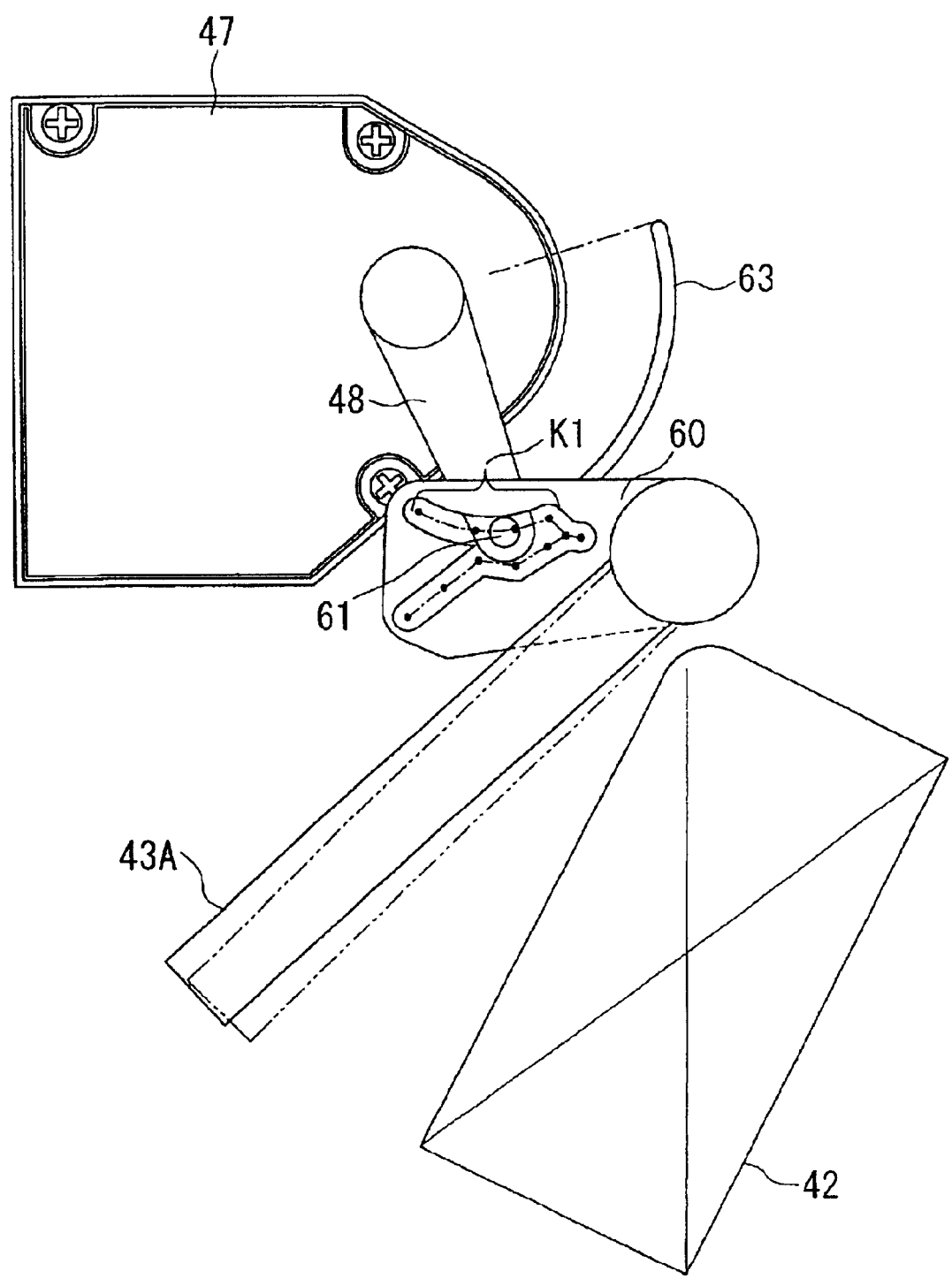
FIG. 8 is a diagram for explaining an operational state of the air mixing damper (with the lever rotation angle at 20 degrees).
Figure 9:
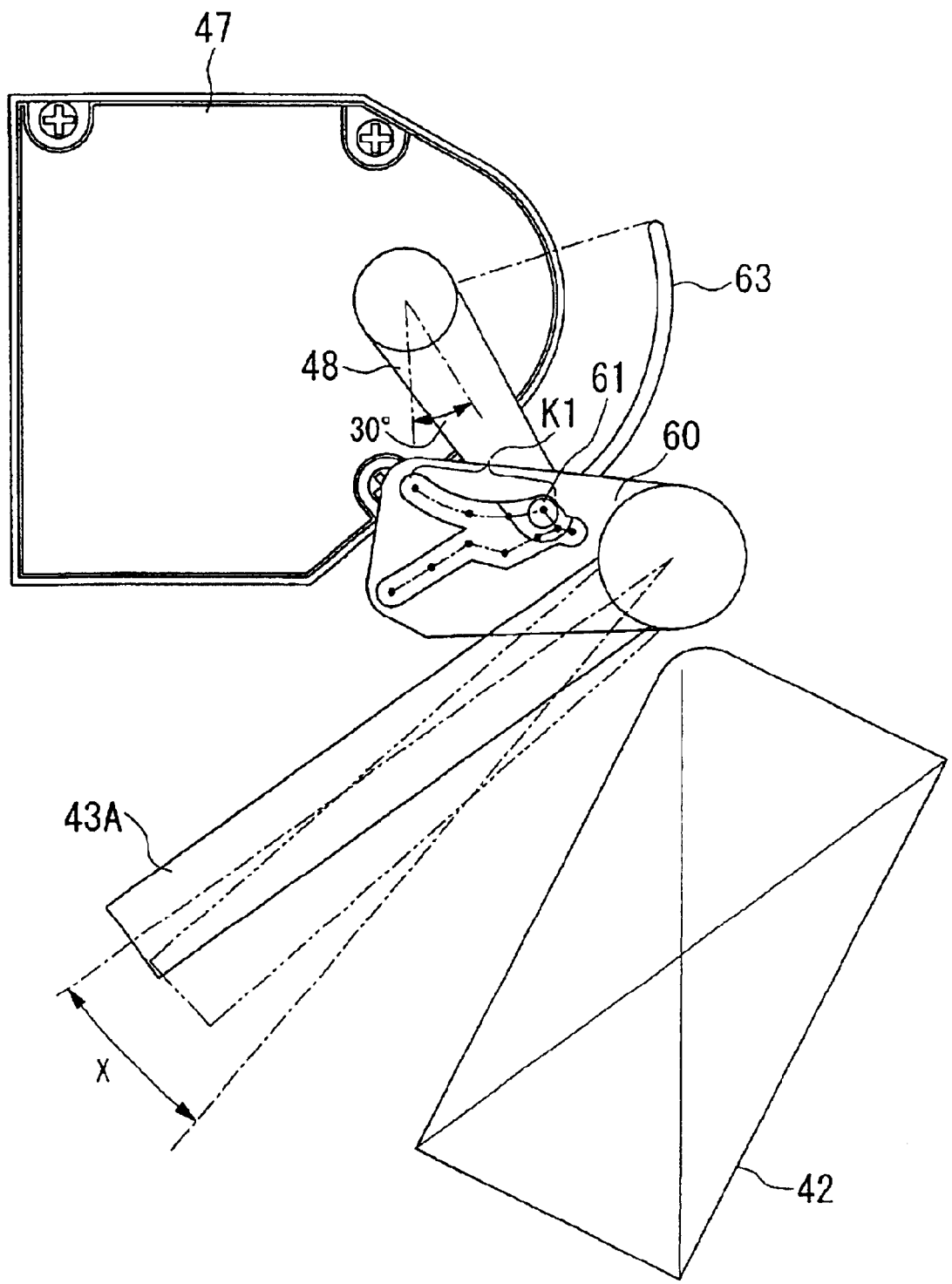
FIG. 9 is a diagram for explaining an operational state of the air mixing damper (with the lever rotation angle at 30 degrees).

Consequently, during this time the air mixing damper 43A opens slowly. Therefore in the initial opening stage X of the air mixing damper 43A being the stage where the temperature of the discharged air changes sensitively, it is possible to set an appropriate position of the air mixing damper 43A in order to obtain a temperature of the discharged air corresponding to the lever operation by an occupant. Furthermore, it is possible to make the occupant feel that the movement of the operating lever by the occupant corresponds to the actual temperature change. Here, in the initial opening stage X, as shown in FIG. 8 and FIG. 9 an unconstrained state of the pin 61 occurs. However, since the coil spring 64 urges the pin 61 into the first guide path K1, the air mixing damper 43A is positively maintained so that the air mixing damper 43A does not swing.

Figure 10:
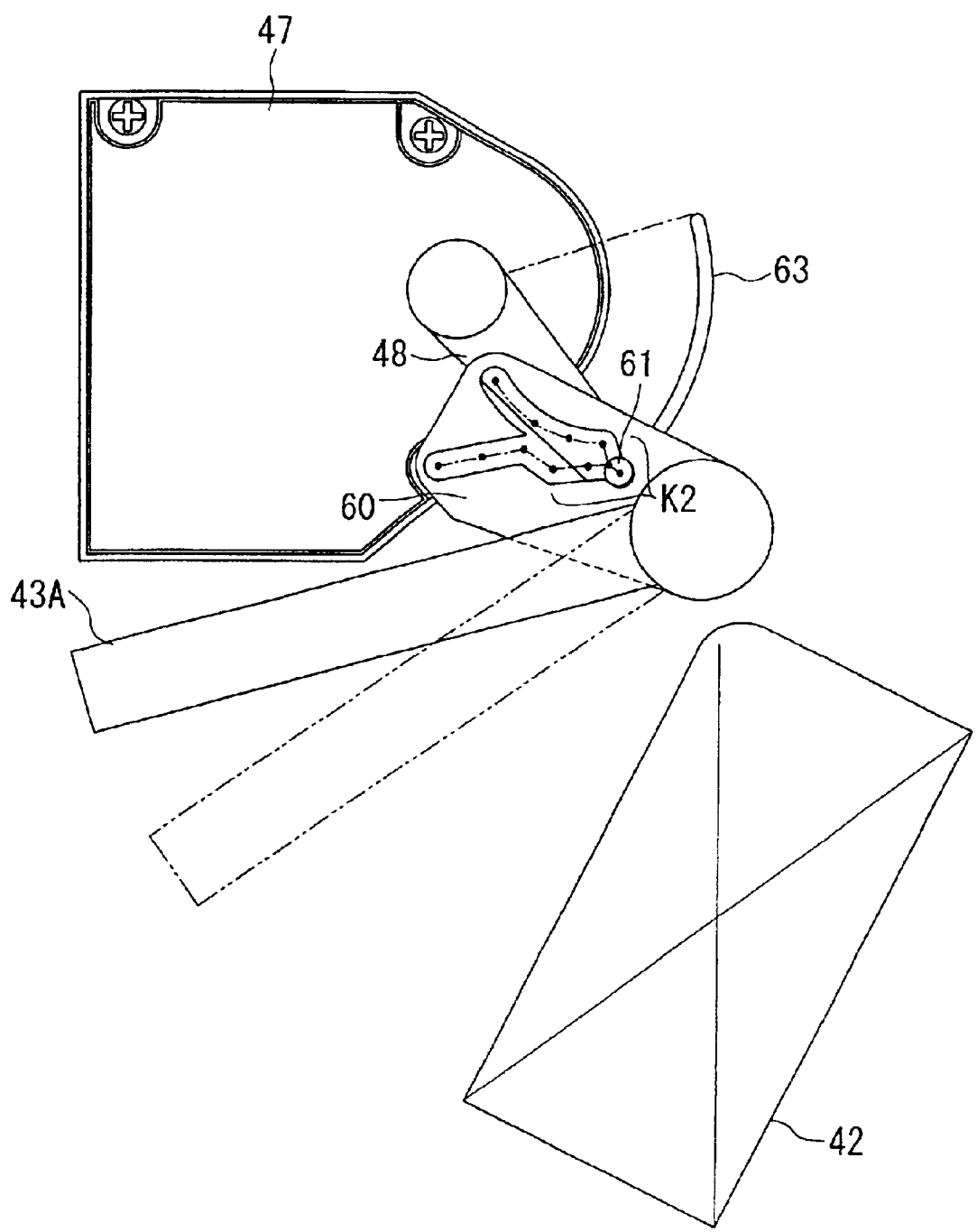
FIG. 10 is a diagram for explaining an operational state of the air mixing damper (with the lever rotation angle at 40 degrees).
Figure 11:
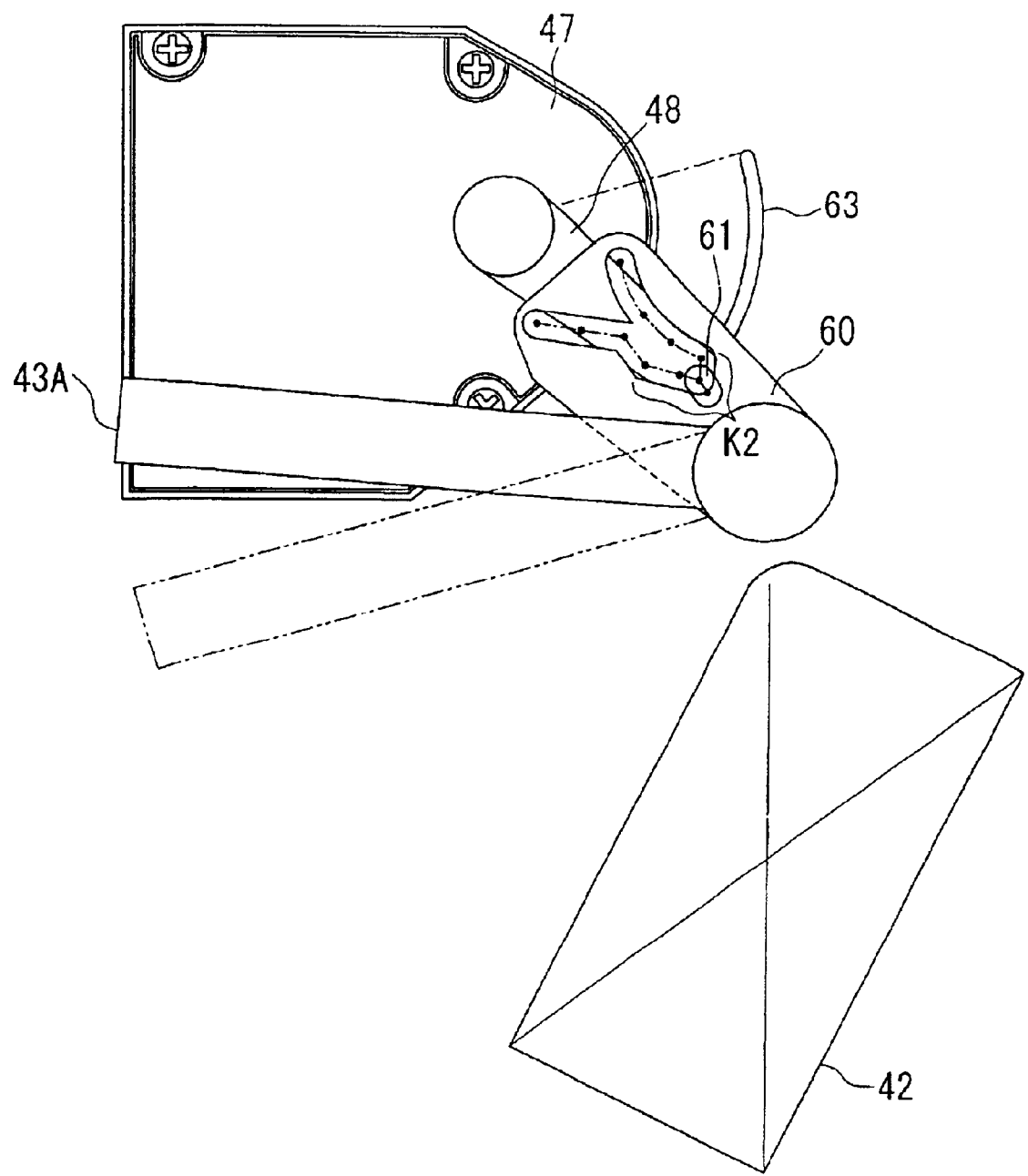
FIG. 11 is a diagram for explaining an operational state of the air mixing damper (with the lever rotation angle at 50 degrees).

In the ranges shown in FIG. 9 through FIG. 13, the lever 48 of the actuator 47 rotates from 30 degrees to 70 degrees, during which time the air mixing damper 43A rotates quickly within the angle range of the intermediate opening stage Y (refer to the steep range in FIG. 2). This is because the second guide path K2 of the cam 60 is shaped in the form of the letter 'V', and as shown in FIG. 10 and FIG. 11, it moves the air mixing damper 43A with the same retraction amount as the movement amount of the pin 61 of the lever 48.

Consequently, during this time the air mixing damper 43A opens quickly at a wide angle. Therefore at the intermediate opening stage Y of the air mixing damper 43A being the stage where the temperature of the discharged air changes slowly, it is possible to set an appropriate position of the air mixing damper 43A in order to obtain a temperature of the discharged air corresponding to the lever operation by an occupant. Furthermore, it is possible to make the occupant feel that the movement of the operating lever by the occupant corresponds to the actual temperature change. The pin 61 not separating from the second guide path K2 as a result of the coil spring 64, is the same as in the case of the initial opening stage X.

In the ranges shown in FIG. 13 through FIG. 16, the lever 48 of the actuator 47 rotates from 70 degrees through to 100 degrees, and during this time the air mixing damper 43A rotates slowly within a small rotation angle range being the final opening stage Z (refer to the low incline range of FIG. 2). This is because the shape of the third guide path K3 of the cam 60, in the fully open position in FIG. 16, is formed in a direction gradually separating outward with respect to the turning path R of the pin 61 of the lever 48. Hence at the final opening stage Z, the degree of opening of the air mixing damper 43A is small with respect of the rotation angle of the lever 48.

Figure 13:
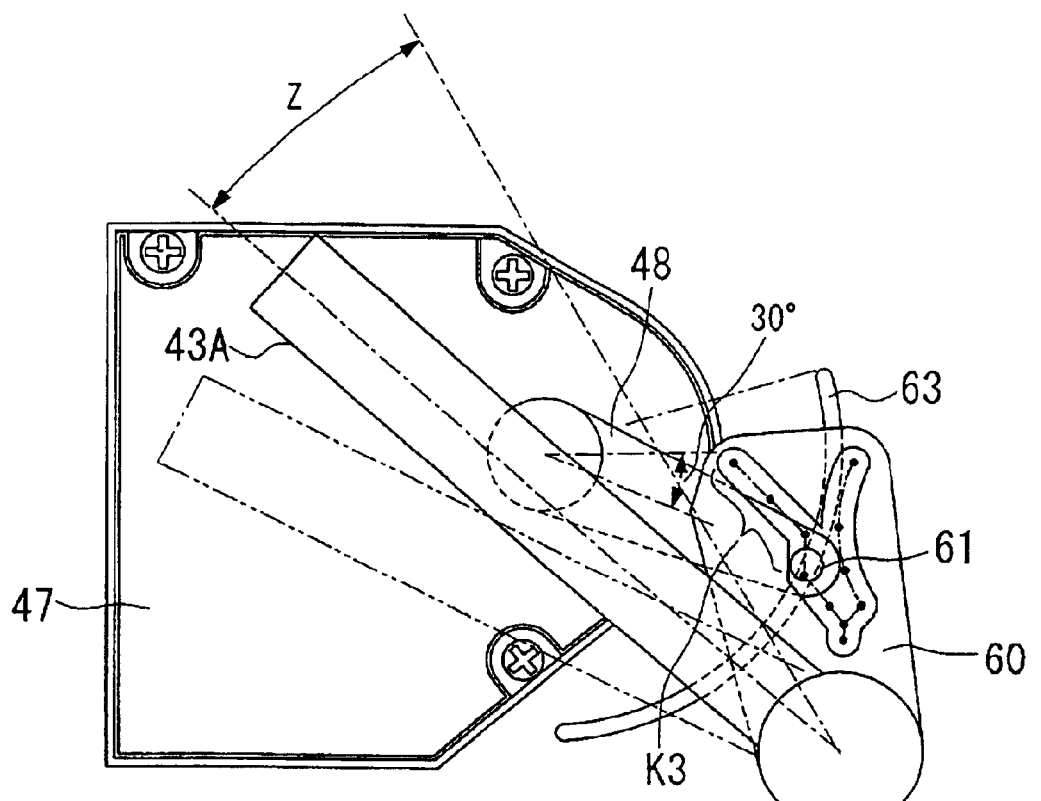
FIG. 13 is a diagram for explaining an operational state of the air mixing damper (with the lever rotation angle at 70 degrees).
Figure 13:
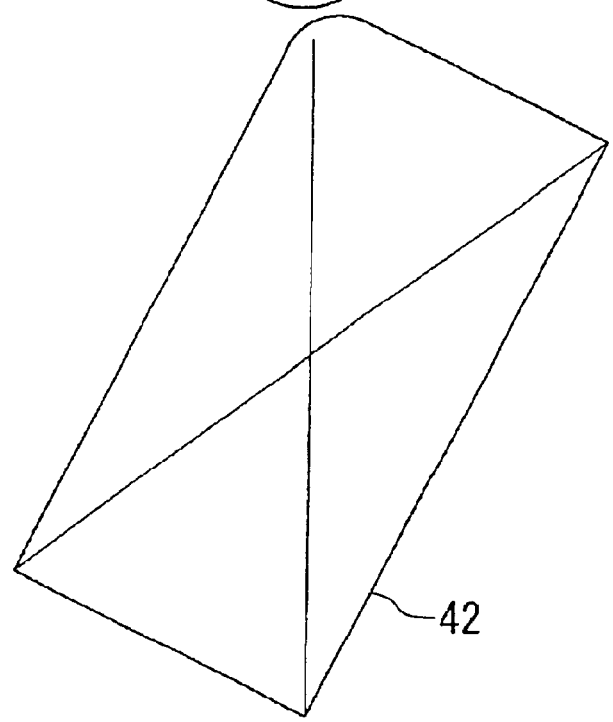
Figure 14:
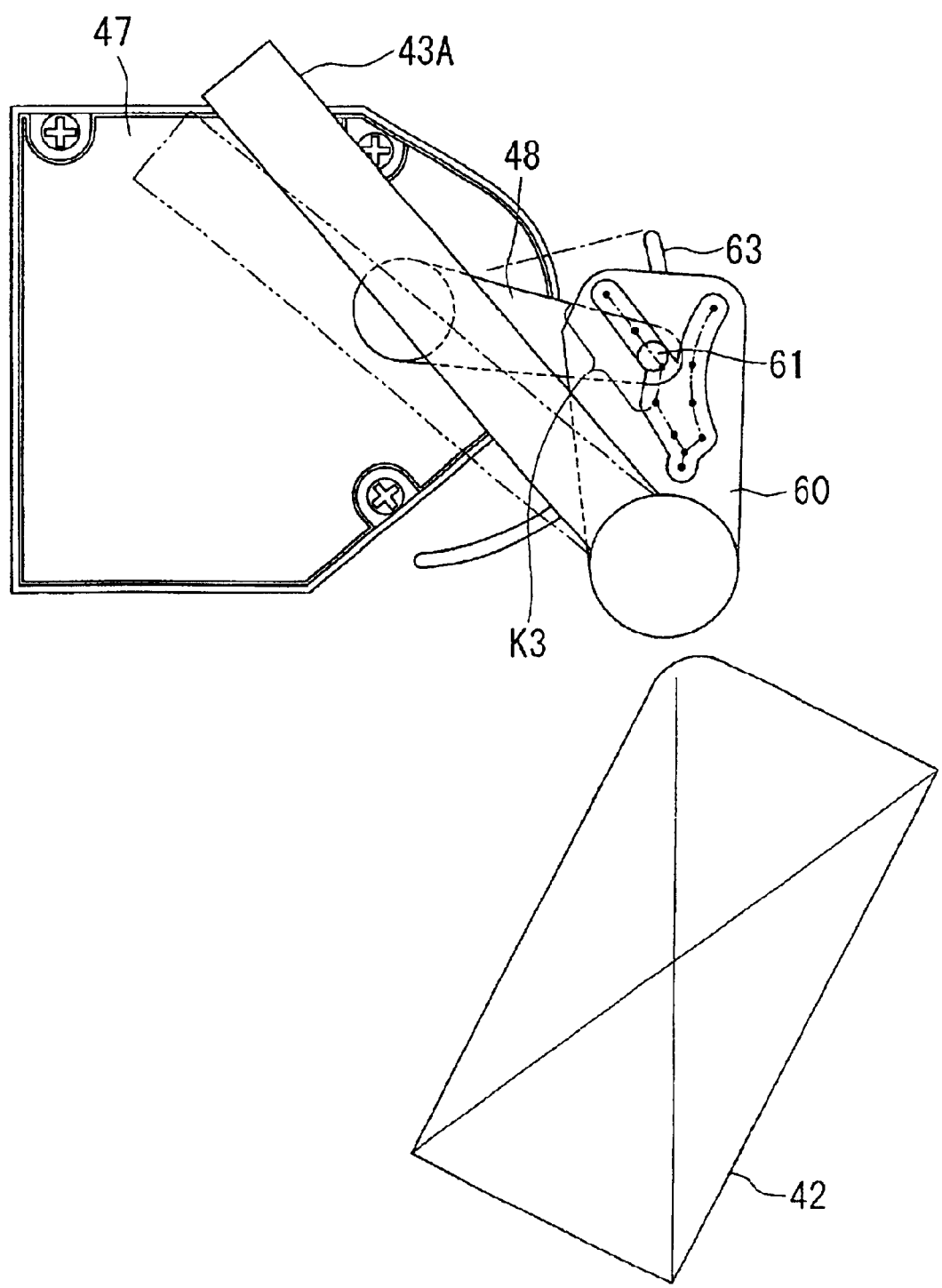
FIG. 14 is a diagram for explaining an operational state of the air mixing damper (with the lever rotation angle at 80 degrees.
Figure 15:
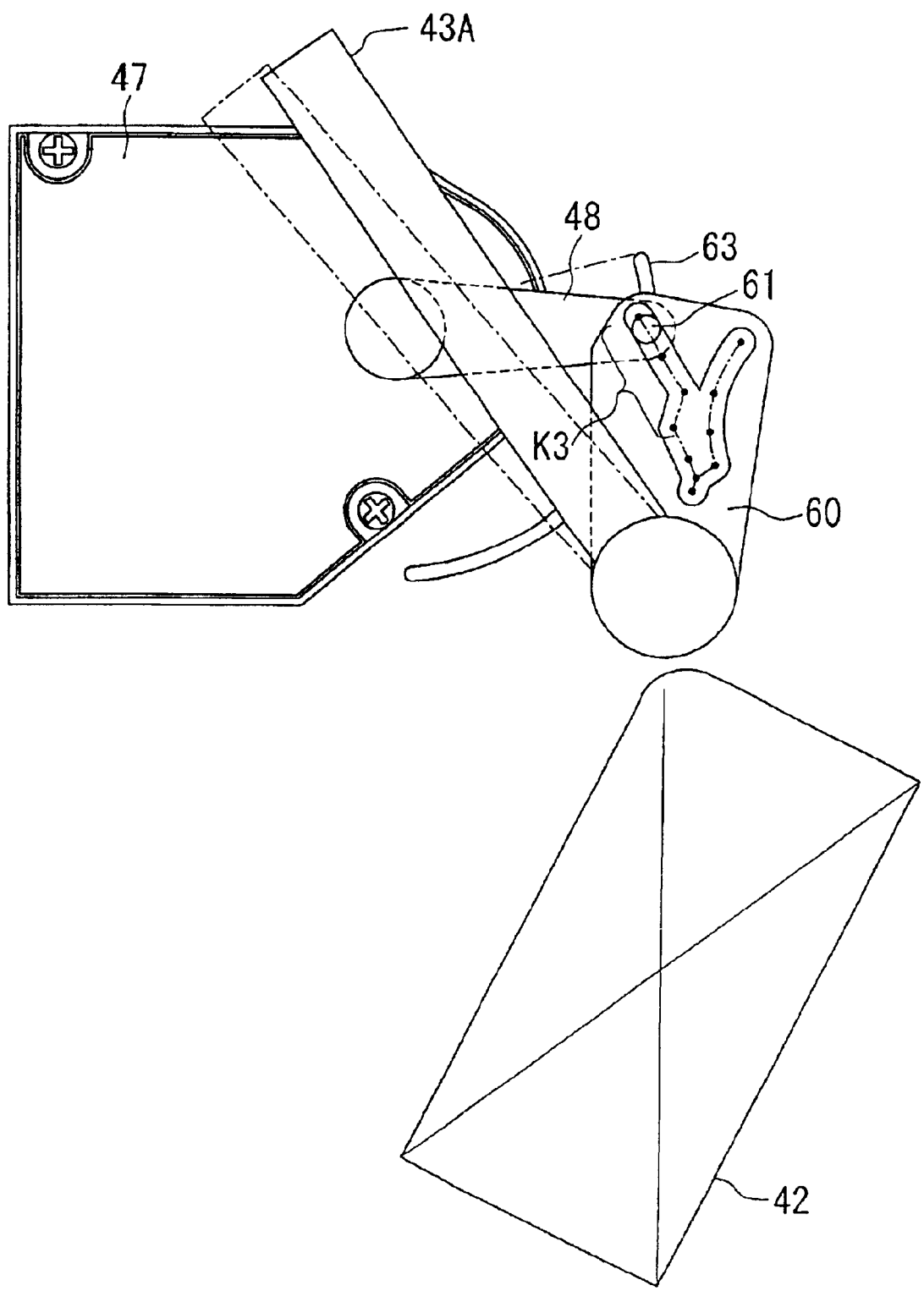
FIG. 15 is a diagram for explaining an operational state of the air mixing damper (with the lever rotation angle at 90 degrees).

Consequently, this time the air mixing damper 43A opens slowly. Therefore as with the beforementioned case of the initial opening stage X, in the final opening stage Z of the 25 air mixing damper 43A being the stage where the temperature of the discharged air changes sensitively, it is possible to set an appropriate position of the air mixing damper 43A in order to obtain a temperature of the discharged air corresponding to the lever operation by an occupant. Furthermore, it is possible to make the occupant feel that the movement of the operating lever by the occupant corresponds to the actual temperature change. Here, in the final opening stage Z, as shown in FIG. 13 an unconstrained state of the pin 61 occurs.

However, since the coil spring 64 urges the pin 61 into the third guide path K3, the air mixing damper 43A is positively maintained so that the air mixing damper 43A does not swing.

Figure 3:
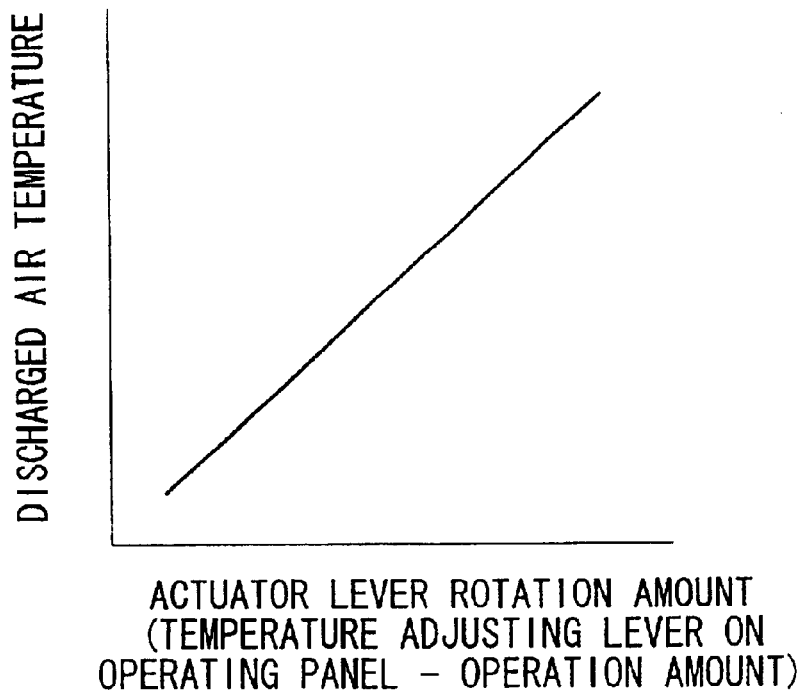
FIG. 3 is a graph showing the relationship between actuator lever rotation amount and discharged air temperature of an embodiment of the present invention.
Figure 17:
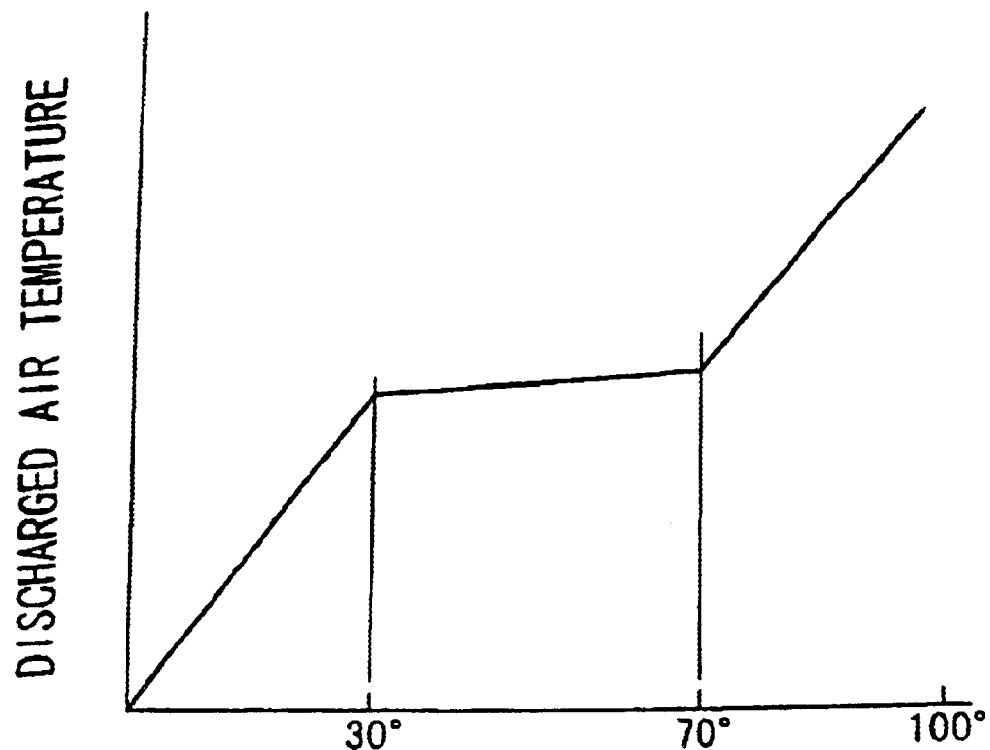
FIG. 17 is a prior art graph corresponding to FIG. 3.

Consequently, the rotation for the air mixing damper 43A is such that the change amount in the opening as shown in FIG. 2 is not the same as the rotation of the actuator 47, namely does not correspond to the operation of the lever L on the operating panel 57 by an occupant. Hence due to this, the variation in temperature of the discharged air (FIG. 17) as happens conventionally in the case where the change amount of the opening of the air mixing damper 43A is constant with respect to the rotation for the air mixing damper 43A, can be made linear. Furthermore, it is possible to set the temperature of the discharged air corresponding to the amount of operation of the lever L (operating means) on the operating panel 57 by the occupant. Hence, it is possible to improve the operation of an air conditioning apparatus for vehicles. In other words, the amount of rotation of the air mixing damper 43A with respect to the amount of operation of the lever L on the operating panel 57 changes from the time when the lever L starts to operate to when its operation is completed. More specifically, the amount of rotation of the air mixing damper 43A with respect to the operation of the lever L on the operating panel 57 at the time when the operation starts and when operation is being completed is less compared to the time when operation is under-way, and as a result it is possible to obtain an ideal discharge temperature, as shown in FIG. 3.

Furthermore, because the operation of the air mixing damper 43A is controlled with a simple cam 60 and pin construction, it is possible to achieve a reduction in costs compared to the case with control on the actuator side.

The present invention is not to be limited to the aforementioned embodiments, and for example, it is acceptable to eliminate the coil spring 64 by making the cam a rotation cam with the first guide path, the second guide path and the third guide path connected in a curved shape. Furthermore, because the initial opening stage X, the intermediate opening stage Y, and the final opening stage Z change due to of various factors such as the configuration of the air conditioning unit 1, the invention also includes cases with openings of the air mixing damper 43A other than those shown.

Industrial Application

As described above, with the air mixing damper apparatus of the first aspect of the present invention, the temperature of the discharged air can be changed linearly with respect to the operation of an actuator lever. Hence there is the effect that the opening and closing operation of the air mixing damper in accordance with the intention of the operator can be realized.

With the air mixing damper apparatus of the second aspect of the present invention, it is possible to lower the change amount with respect to the movement of the actuator lever at the initial opening stage and the final opening stage of the air mixing damper, to less than at the intermediate opening stage. Therefore at the initial opening stage and the final opening stage of the air mixing damper, the change in temperature of the discharged air corresponding to the opening of the air mixing damper can be made gentle. Consequently, there is the effect that the change in the temperature of the discharged air with respect to actuator lever movement through the period from the fully closed position to the fully open position of the air mixing damper can be made linear.

With the air mixing damper of the third aspect of the present invention, there is the effect that a positive operation can be ensured with a simple cam and pin construction, without the need to improve the actuator.

With the air mixing damper of the fourth aspect of the present invention, for example the first guide path, the second guide path, and the third guide path can be formed corresponding to the location part of the air mixing damper. Therefore there is the effect that the air mixing damper can be operated by positively moving in a predetermined manner while the pin of the actuator lever is being guided along the respective guide paths.

With the air mixing damper of the fifth aspect of the present invention, for example the first guide path, the second guide path, and the third guide path can be formed corresponding to the location part of the air mixing damper. Therefore there is the effect that the air mixing damper can be operated by moving in a predetermined manner while the pin of the actuator lever is being guided along the respective guide paths constituting the periphery of the opening portion.

With air mixing damper of the sixth aspect of the present invention, in the initial opening stage of the air mixing damper, when the air mixing damper starts to open from a fully closed position, it is possible to operate in such a way that it opens gradually. Moreover, in the final opening stage of the air mixing damper, it is also possible to operate in such a way that it opens gradually during the interval between a near fully opened position and a fully opened position. Hence the rotation speed of the air mixing damper at the initial opening stage and the final opening stage can be made less than at the intermediate stage. Therefore at the initial opening stage and the final opening stage of the air mixing damper, the change in temperature of the discharged air corresponding to the opening of the air mixing damper can be made gentle. Consequently, there is the effect that the change in the temperature of the discharged air with respect to actuator lever movement through the period from the fully closed position to the fully open position of the air mixing damper can be made linear.

With air mixing damper of the seventh aspect of the present invention, the pin of the actuator lever can be guided in at least the first guide path and the third guide path. Therefore, the movement of the actuator can be positively transmitted to the air mixing damper.

With air mixing damper of the eighth aspect of the present invention, there is the effect that the change in the temperature of the discharged air with respect to actuator lever movement through the period from the fully closed position to the fully open position of the air mixing damper can be made linear.

With the air conditioning apparatus for vehicles of the ninth aspect of the present invention, there is the effect that the temperature of the discharged air can be linearly changed in accordance with the operation by an occupant of temperature adjustment of the discharged air. Therefore there is the effect that conditioned air matching the operation of temperature adjustment can be realized.

With air mixing damper of the tenth aspect of the present invention, there is the effect that the change in the temperature of the discharged air with respect to the operation by an occupant of temperature adjustment of the discharged air can be made constant.

With air mixing damper of the eleventh aspect of the present invention, there is the effect that the temperature of the discharged air can be linearly changed with respect to the operation by an occupant of temperature adjustment of the discharged air.

What is claimed is:

1. An air mixing damper apparatus comprising:
a mechanism provided between a plate door type air mixing damper for opening and closing an air introducing face of a heater core, and a rotation type lever of an actuator for driving the air mixing damper, the mechanism for adjusting rotational speed of the air mixing damper to linearly change the temperature of discharged air with respect to the operation of the lever of the actuator, said mechanism for adjusting rotational speed comprising:
a cam connected to the air mixing damper and a pin provided on the lever of the actuator for engaging with said cam, said cam incorporating a guide path for guiding the pin of the lever of the actuator, and the guide path has a first guide path for effecting control at an initial opening stage of the air mixing damper, a second guide in path for effecting control at an intermediate opening stage of the air mixing damper, and a third guide path for effecting control at a final opening stage of the air mixing damper, first guide path formed in a direction gradually separating outward with respect to a turning path of the pin of the lever of the actuator, in a fully closed position of the air mixing damper, and said third guide path formed in a direction gradually separating outward with respect to the turning path of the pin of the lever of the actuator, in a fully open position of the air mixing damper; and
urging means for urging the pin of the lever of the actuator into the first guide path at least at an initial opening stage of the air mixing damper, and for urging the pin of the lever of the actuator into the third guide path at least at a final opening stage of the air mixing damper.

2. An air conditioning apparatus for vehicles having an air conditioning unit provided with:
an inside air/outside air box incorporating an inside/outside air switching damper configured to open an outside air introducing inlet and an inside air introducing inlet to selectively switch introduced air to one of inside air and outside air,
a blower unit comprising a blower fan configured to blow the introduced air,
a cooler unit comprising an evaporator configured to exchange heat between a refrigerant and said introduced air passing therethrough, and
a heater unit comprising a heater core disposed inside a heater unit case and configured to heat the introduced air passing therein, the air mixing damper apparatus according to claim 1 the air mixing damper apparatus configured to adjust a flow quantity of said introduced air passing through said heater core, and a plurality of air outlets opening from said heater unit case and respectively provided with dampers.

3. An air mixing damper apparatus comprising:
a mechanism provided between a plate door type air mixing damper for opening and closing an air introducing face of a heater core, and a rotation type lever of an actuator for driving the air mixining damper, the mechanism for adjusting rotational speed at an initial opening stage and a final opening stage of the air mixing damper, to a speed lower than at an intermediate opening stage, said mechanism for adjusting rotational speed comprising:
a cam connected to the air mixing damper and a pin provided on the lever of the actuator for engaging with said cam said cam incorporating a guide path for guiding the pin of the lever of the actuator, and the guide path has a first guide path for effecting control at the initial opening stage of the air mixing damper, a second guide path for effecting control at the intermediate opening stage of the air mixing damper, and a third guide path for effecting control at the final opening stage of the air mixing damper, said first guide path formed in a direction gradually separating outward with respect to a turning path of the pin of the lever of the actuator, in a fully closed position of the air mixing damper, and said third guide path formed in a direction gradually separating outward with respect to the turning path of the pin of the lever of the actuator, in a fully open position of the air mixing damper; and urging means for urging the pin of the lever of the actuator into the first guide path at least at an initial opening stage of the air mixing damper, and for urging the pin of the lever of the actuator into the third guide path at least at a final opening stage of the air mixing damper.

4. The air mixing damper apparatus according to claim 3 wherein a range of opening of the air mixing damper is from fully closed to about 15 degrees in said initial opening stage and a range of opening of the air mixing damper is from 20 degrees from fully open to fully open in the final opening stage.

5. An air conditioning apparatus for vehicles having an air conditioning unit provided with:

an inside air/outside air box incorporating an inside/outside air switching damper configured to open an outside air introducing inlet and an inside air introducing inlet to selectively switch introduced air to one of inside air and outside air, a blower unit comprising a blower fan configured to blow the introduced air, a cooler unit comprising an evaporator configured to exchange heat between a refrigerant and said introduced air passing therethrough, and a heater unit comprising a heater core disposed inside a heater unit case and configured to heat the introduced air passing therein, the air mixing damper apparatus according to claim 3 the air mixing damper apparatus configured to adjust the flow quantity of said introduced air passing through said heaters core, and a plurality of air outlets opening from said heater unit case and respectively provided with dampers.

* * * * *